US012792751B2

(12) United States Patent
Daughety et al.

(10) Patent No.: US 12,792,751 B2
(45) Date of Patent: Nov. 10, 2026

(54) CROSS-DOMAIN SOLUTION ARCHITECTURE

(71) Applicants: The Regents of the University of Colorado, Denver, CO (US); GOVERNMENT OF THE UNITED STATES AS REPRESENTED BY THE SECRETARY OF THE AIR FORCE, Rome, NY (US); Board of Regents, The University of Texas System, Austin, TX (US); The United States of America as represented by the Secretary of the Navy, San Antonio, TX (US)

(72) Inventors: Nathan Daughety, Pleasant Plain, OH (US); Marcus Pendleton, San Antonio, TX (US); Shouhuai Xu, Colorado Springs, CO (US); Laurent L. Njilla, Liverpool, NY (US); Tyler Reuther, San Antonio, TX (US)

(73) Assignees: The Regents of the University of Colorado, Denver, CO (US); GOVERNMENT OF THE UNITED STATES AS REPRESENTED BY THE SECRETARY OF THE AIR FORCE, Rome, NY (US); Board of Regents, The University of Texas System, Austin, TX (US); The United States of America as represented by the Secretary of the Navy, San Antonio, TX (US)

( * ) Notice: Subject to any disclaimer, the term of this patent is extended or adjusted under 35 U.S.C. 154(b) by 107 days.

(21) Appl. No.: 18/138,053

(22) Filed: Apr. 22, 2023

(65) Prior Publication Data

US 2024/0086554 A1 Mar. 14, 2024

Related U.S. Application Data

(60) Provisional application No. 63/363,430, filed on Apr. 22, 2022.

(51) Int. Cl.
*G06F 21/60* (2013.01)
*G06F 21/74* (2013.01)

(52) U.S. Cl.
CPC ............ *G06F 21/604* (2013.01); *G06F 21/74* (2013.01); *G06F 2221/2113* (2013.01); *G06F 2221/2141* (2013.01)

(58) Field of Classification Search
CPC ........... G06F 21/604; G06F 2221/2113; G06F 2221/2141; G06F 21/74
See application file for complete search history.

(56) References Cited

U.S. PATENT DOCUMENTS

| | | | | |
|---|---|---|---|---|
| 2006/0248592 A1* | 11/2006 | Agrawal | ............. | G06F 21/6245 707/999.009 |
| 2013/0151849 A1* | 6/2013 | Graham | .................. | G06F 21/85 713/164 |

(Continued)

OTHER PUBLICATIONS

N. Daughety et al., "Auditing a Software-Defined Cross Domain Solution Architecture", IEEE International Conference on Cyber Security and Resilience (CSR), Mar. 2022, pp. 96-103.

(Continued)

*Primary Examiner* — Ellen Tran
(74) *Attorney, Agent, or Firm* — Cozen O'Connor

(57) ABSTRACT

A cross-domain solution architecture includes a higher-security domain and a lower-security domain. The higher-security domain (i) processes data on a higher-security level, and (ii) includes a hardware-based trusted executed environment (TEE) running a formally verified microkernel. The lower-security domain (i) processes data on a lower-security level having lower security than the higher-security level, (Continued)

and (ii) includes a trusted computer base (TCB). The TCB operates in the higher-security domain and the lower-security domain to pass data from the lower-security domain to the higher-security domain through a first data diode, and to pass data from the higher-security domain to the lower-security domain through a second data diode.

20 Claims, 5 Drawing Sheets

(56) References Cited

U.S. PATENT DOCUMENTS

| | | | | |
|---|---|---|---|---|
| 2014/0139737 | A1* | 5/2014 | Clarke | H04N 21/00 348/465 |
| 2017/0048259 | A1* | 2/2017 | Dodge | H04L 63/168 |
| 2018/0351914 | A1* | 12/2018 | Jobson | H04L 63/0245 |
| 2019/0114200 | A1* | 4/2019 | Lee | G06Q 10/06 |
| 2020/0099658 | A1* | 3/2020 | Couillard | G09C 1/00 |
| 2020/0159888 | A1* | 5/2020 | Ghose | G06F 12/0842 |

OTHER PUBLICATIONS

N. Daughety, "Design and analysis of a trustworthy, cross domain solution architecture", (Order No. 29704298). Available from ProQuest Dissertations & Theses Global. (2722317078), May 9, 2022, 238 pages.

L. Burdusel, "A Secure Communication System for classified documents over public network", IEEE, International Conference on Communications, Jun. 2010, pp. 485-488.

D. E. Bell et al., "Secure Computer System: Unified Exposition and Multics Interpretation", National Technical Information Service (NTIS) U.S. Department of Commerce, Mar. 1976, 133 pages.

W. Chengjun, "Research on the Microkemel Technology", Second International Workshop on Computer Science and Engineering, Oct. 2009, vol. 2, pp. 199-202.

N. Daughety et al., "vCDS: A Virtualized Cross Domain Solution Architecture", IEEE Military Communications Conference, Nov. 2021, pp. 61-68.

* cited by examiner

CROSS-DOMAIN SOLUTION ARCHITECTURE

CROSS-REFERENCE TO RELATED APPLICATIONS

This application claims the benefit of U.S. Provisional Application No. 63/363,430, filed Apr. 22, 2022, the disclosure of which is incorporated herein by reference in its entirety.

GOVERNMENT RIGHTS

This invention was made with government support under grant number 2122631 awarded by the National Science Foundation, and grant number 2115134 awarded by the U.S. Army Research Office. The government has certain rights in the invention.

BACKGROUND

In the context of military information systems, a domain is an environment that contains a set of computer-based systems, processes, data, controls, and security policies defined by a classification label, which serves in isolation from other systems and can only be accessed using a defined set of rules. Similarly, a security domain is a system or set of systems separated from other domains by a boundary defined by an administrative security policy. The objective of the security policy is to uphold classification level, information access and transfer regulations, and data ownership within a domain. Creating a secure connection between security domains necessitates the implementation of multifaceted security policies for information flow management in a Cross-domain solution (CDS). Cross domain refers to the access to and/or transport of data across domains of isolated and/or differing classification levels. A CDS enforces a security policy on an interface between the discrete security domains.

SUMMARY OF THE EMBODIMENTS

The embodiments provide a CDS architecture designed within a single host for data confidentiality protection. The terms high and low are used herein, to describe domains of higher and lower security classification levels. One embodiment, which seeks to provide protection against attacks on physical memory and buses through memory encryption utilizes trusted execution environment (TEE) technologies. One software embodiment is a formally verified microkernel which serves to abstract the trusted execution environment from the security domains as the trusted computing base (TCB). In addition to the functional correctness proofs, the TCB provides the assurance of decidable security confidentiality protection model, as well as staticity in the communication channels meaning that all defined channels are immutable, and no channels can be created after compile time [1, 2, 3]. To the best of our knowledge, no existing CDS uses a formally verified TCB. Embodiments, herein, rely on a formally verified TCB. In another embodiment, high and low security domains are represented in addition to a unidirectional data flow control mechanism which, combined, form the perceptible basis for which embodiments are classified as a CDS system. Additionally, there is an optional embodiment—a guard—which can be formulated to fit specific use-cases and applications. If further isolation is required, co-processor boards can be used to provide separation between a dedicated low domain and a system composed of the aforementioned embodiments.

In a first aspect, a cross-domain solution architecture includes a higher-security domain and a lower-security domain. The higher-security domain (i) processes data on a higher-security level, and (ii) includes a hardware-based trusted executed environment (TEE) running a formally verified microkernel. The lower-security domain (i) processes data on a lower-security level having lower security than the higher-security level, and (ii) includes a trusted computer base (TCB). The TCB operates in the higher-security domain and the lower-security domain to pass data from the lower-security domain to the higher-security domain through a first data diode, and to pass data from the higher-security domain to the lower-security domain through a second data diode.

BRIEF DESCRIPTION OF THE EMBODIMENTS

DETAILED DESCRIPTION OF THE EMBODIMENTS

Figure 1:
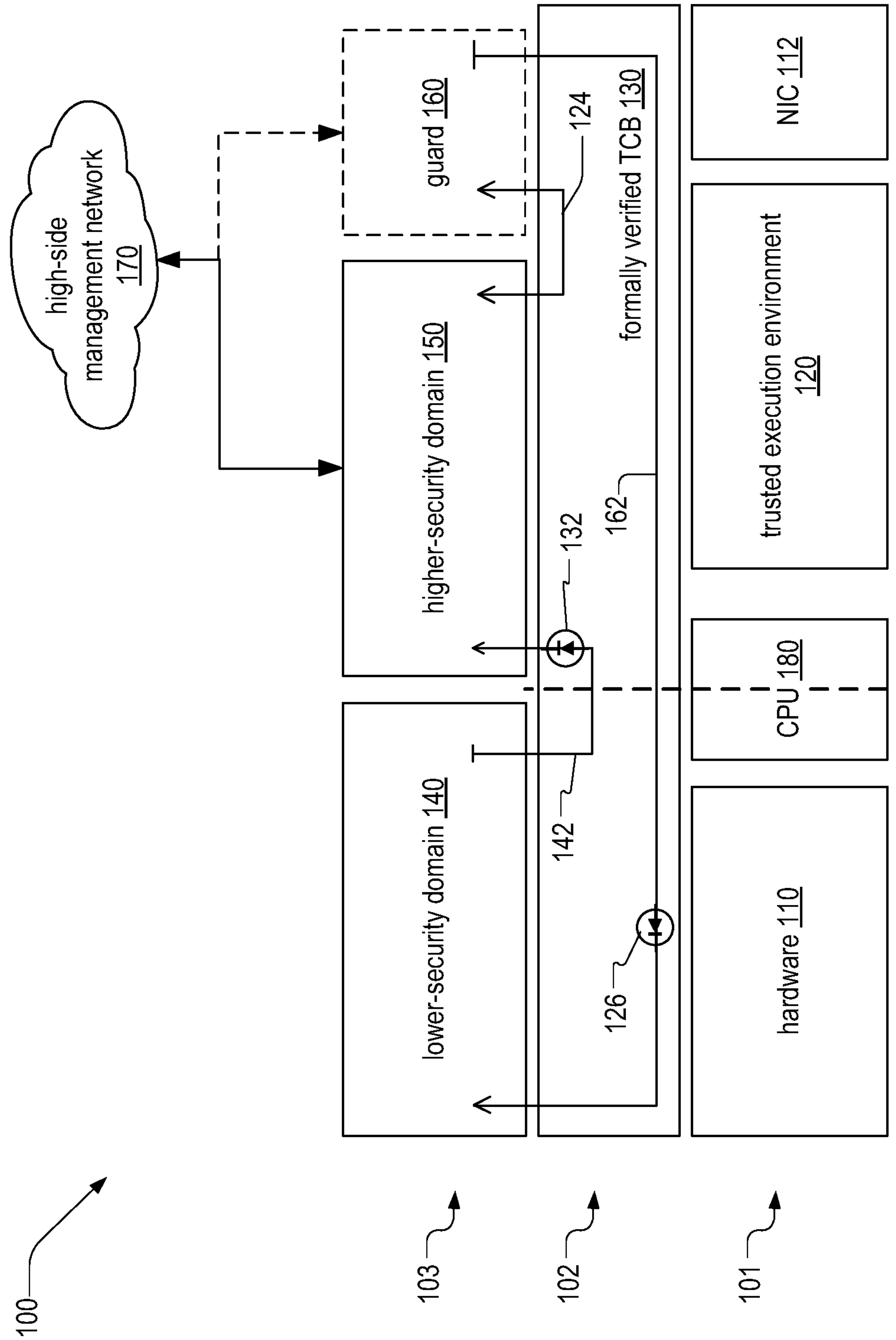
FIG. 1 is a high-level functional block diagram illustrating one example generic cross-domain solution (CDS), in embodiments.

Embodiments described below entail a computing architecture by which the goals of cross-domain solution technology may be achieved within a single host using commodity hardware. To understand how the embodiments uniquely solve limitations of prior art, it is helpful to understand these limitations. These limitations are, namely, with trustworthiness, accessibility, and deployability [1].

A. Cross Domain Foundations

A cross-domain solution (CDS) system provides secure access and/or transfer of data across differing trust boundaries. A CDS is evaluated for the following: 1) defensive effectiveness, or how well it protects against a defined threat model; 2) data confidentiality, the protection of content from unauthorized entities; and 3) operational relevance, the flexibility to perform across multiple applications and environments [1, 3, 14, 34]. There are three categories of CDSs: access, transfer, and multi-level solutions (ILS). Access solutions provide functionality to access one domain from another, transfer solutions provide the ability to copy data from one domain to another, and MLS offers both access and transfer capabilities. Generally, a CDS includes three components: an isolated computation domain, a data diode, and a guard. Each of these three components requires protection mechanisms that adhere to the Bell-Lapadula mandatory access control model [29].

One such protection mechanism is the computation-isolation domain. This mechanism is used by CDS systems to perform computations within a trusted, isolated computer environment or "secure enclave." This concept may be applied to nearly all security procedures as it allows operations to commence in secured environments. A mechanism often used by CDS systems to protect data flow is the data diode. Data diodes are devices that enforce a unidirectional flow of data. The primary intent of a data diode is to mitigate the risk of data leaking from a higher-security domain down to a lower-security domain, further mitigating a data confidentiality threat model.

Another mechanism often used by CDS systems is a guard; a guard is a "trustworthy application which is responsible for analyzing the content of the communication and determining whether this communication is in accordance with the system security policy" [7]. Guard components are implemented as filters, which may modify or delete messages; verifiers, which may check data integrity; and isolation mechanisms, which may separate the data [11].

B. Security Models

A mandatory access control (MAC) model is a formal set of rules by which data access is always governed and a discretionary access control model (DAC) is a security policy which allows for administrator discretion when providing subjects (e.g., a user of the CDS) with access to objects. The Bell-Lapadula (BLP) access control model is one such model that employs both of these security policies as a top-down state machine that enforces data confidentiality and controlled access to classified information designed specifically to formalize MLS for a government agency [24]. This model's primary objective is to preserve data confidentiality [5]. Furthermore, BLP enforces rules to ensure that subjects may only read objects at or below their own access level, individuals may only create objects at or above their own access level, and all access requests must be authorized based on a control matrix that defines subjects' access rights. Additionally, this model preserves the principle of least privilege (POLP) assuring that a subject may only access the minimum resources necessary for a particular operation.

Within a similar context lies the data protection model (DPM). One such DPM is the take-grant model that is a directed graph expressing the conditions under which an object may acquire authority over another object within a system. There are four common rules employed by the model: take, which permits the subject to take the rights of another object; grant, which permits the subject to grant rights to another object; create, which permits the subject to create a new object; and remove, which permits the subject to remove the rights it has over an object [8]. The take-grant model has been shown to be decidable in linear time [6] and, therefore, object security, that is, whether or not rights will or can leak in a particular safety model, is decidable.

C. Trusted Computing Technologies

Trusted execution environments (TEEs) are integrity protected processing environments that yield processing, memory, and storage capabilities [13]. The principal mechanisms in a TEE produce runtime-state protection, data isolation and data restriction, ensuring security through confidentiality. Clearly, this involves protection against physical memory/bus attacks and software-based attacks.

A secure coprocessor is a physically secure, tamper-proof subsystem composed of processors, memory storage, and support for cryptographic operations. The fundamental objective is computation and storage security such that an adversary who has physical access to the host cannot violate data confidentiality. Secure coprocessors further provide component-based computation isolation which aids in mitigating physical memory attacks.

A trusted computing base (TCB) is the totality of protection mechanisms responsible for enforcing a security policy [4]. Herein, a TCB may include at least one of hardware, firmware, and software. In modern systems, there are two integral components, the reference monitor and the security kernel. The reference monitor provides complete mediation of access controls, validating access to all objects by authorized subjects. The security kernel provides the lowest level of abstraction, linking the software to the hardware and employs mechanisms to enforce security at differing boundaries to prevent any unauthorized interactions. In many cases, security microkernels, which are kernel implementations that provide the smallest possible set of essential operations plus the additional protection mechanisms, are more practical for functional correctness verification.

D. Achieving Cross-Domain Solution within a Single Host

Embodiments disclosed herein achieve the goals of cross-domain solution technology within a single host using commodity hardware. To understand how the invention uniquely solves limitations of prior art, it is helpful to understand these limitations. These limitations are, namely, with trustworthiness, accessibility and deployability [1, 3].

1) Trustworthiness

To understand trustworthiness as it pertains to these embodiments, it is essential to distinguish it from trust. Trust, when referring to a security solution, is blanket confidence in the system capabilities to handle an event. However, that trust is easily broken when the system fails to handle a security event. In the same context, trustworthiness is the measurable proof assurance that a system will successfully handle the event in a predictable manner. The limitation in prior art CDS technology, with regards to trustworthiness, is the lack of evaluable assurance in the form of formal verification. Embodiments described herein leverage mathematically proven assurance or trustworthiness to ensure greater security.

2) Accessibility

CDS technology is almost exclusively managed by government entities. References [14] and [21] suggest that CDS architectures lack accessibility to the commercial and private sectors outside of government agency designations. Additionally, due to the expensive technologies used in CDS solutions, general accessibility is inhibited. Embodiments address the inhibited accessibility by design; this technology is built upon low-cost, readily available, commodity hardware and software systems. In light of the openness of the system, additionally, its risks are better understood, eliminating the ever-failing concept of security through obscurity.

3) Deployability

Reference [14] states that current CD products are only available as "secure appliance" or "strong box" implementations meaning that most reside in a physically isolated environment and are not remotely deployable (e.g., LGC-IRD-100) [19, 25]. Those systems that are remotely deployable are generally regarded as ad hoc and insecure, inconvenient to mobilize (e.g., CS-4000) [17, 25] and/or highly specialize solutions that are expensive to implement and modify, further highlighting the technology gap outlined by [9]. The embodiments herein, however, solves these issues by allowing for inexpensive modification and maintenance as well as secure remote deployability with the shift to cloud technology.

To better understand the problems corrected by these embodiments, it is helpful to understand the desired security model, key concepts and architectures of CDSs that achieve that model, and limitations of the prior art attempting to implement it.

E. Security Model/Threat Model

In designing any security system, a threat model needs to be identified so that specific challenges may be effectively and efficiently addressed in the design. In the case of CDS technology, the threat of disclosure or spillage of information from a domain containing sensitive information, or high side, to a domain unauthorized to receive such information, or low side, while permitting the information flow from low to high, is the primary concern.

The Bell-LaPadula security model, which is a formal security model to protect confidentiality between security domains and the de facto standard which most CDS technology strives to meet, is the model chosen as the basis of these embodiments. Therefore, the threat model for this CDS focuses on compromising data confidentiality through various information disclosure attacks.

Attackers are often capable of employing covert channels, disrupting data flow by causing unauthorized movement, or gaining unauthorized access to resources to compromise the confidentiality of the data. Additionally, insider access, network-borne attacks where an attacker might spoof a target or intercept data, and physical attacks on main memory and buses are all a part of the threat model. In the case of a CDS on a single host, each of the above risks are even more pronounced as a threat actor only needs to focus on one device.

The vast majority of current CDS products are available only as a secure appliance or strong box implementation meaning they rarely operate outside of a physically isolated environment [14]. As mentioned previously, remotely deployable CDS products are regarded as ad hoc and insecure, inconvenient to mobilize (e.g., CS-4000) [25], and/or highly specialize solutions which are expensive to implement and modify. Additionally, problems still exist when it comes to the cooperation between government entities as the evidence shows these strong box architectures are only available to government entities, which poses an accessibility problem for any other entities that may want to use it, prompting the use of ad hoc, high-risk solutions by those entities. References [9] and [12] detail several of the challenges with the current status quo of CDS designs which include reliability and assurance (trustworthiness), remote deployability, and accessibility. These facts pose a significant threat to data confidentiality for multiple reasons. For one, a system that is not proven trustworthy should not be trusted to securely maintain data. Farroha et al. analyze the "technological gap where the lack of equipment due to the lack of supporting technologies is causing a limitation on information sharing to stay away from expanding the risk profile" meaning that current, untrustworthy, systems are unnecessarily increasing risk [9]. Additionally, the status quo in CDS technology does not allow for remote deployability as it could expose and compromise the data. Furthermore, when making CDS capabilities accessible to sectors outside of government agencies, no artifacts are publicly available for the independent verification of security properties, thereby exposing security through obscurity as a failed security technique.

F. CDS Architecture

The described embodiments implement a hardware-based TEE in concert with a formally verified microkernel. These joint technologies provide hardware protection in the form of encryption along with the formal proof of software assurance. Furthermore, these embodiments apply data diode techniques to the data cycle to ensure that data movement is restricted to one direction. Additionally, a high level component, called a guard, may be employed. The guard is optional and may be customized to individual use-cases to further protect and restrict the movement of data as defined by a set of filter rules. This section references the illustrations provided in the Representative Diagrams section. Reference numbers are used to refer to specific elements in the drawings to visualize the embodiments presented here.

FIG. 1 is a high-level functional block diagram illustrating a technology stack of a generic cross-domain solution (CDS) 100, the basic flow of data, and high side interactions with a high-side management network 170. CDS 100 includes a hardware layer 101, a computing base layer 102, and a software component layer 103. Software component layer 103 includes a lower-security domain 140, a higher-security domain 150, and may also include a guard 160.

Hardware layer 101 includes hardware 110, a CPU 180, and a network interface card (NIC) 112. Hardware layer 101 may also include a TEE 120. Hardware 110 executes lower-security domain 140. Hardware includes 110 contains very few added security components as it is the base hardware of the low security boundary (e.g., lower-security domain 140). In embodiments, CPU 180 implements TEE 120.

TEE 120 corresponds to data and computations of higher-security domain 150, while the lower-security domain 140 leverages the basic hardware capabilities. CPU 180 manages all processing of data for the components residing in layers 102 and 103. NIC 112 functions only with the higher-security domain 150 and guard 160.

Layer 102 includes a formally verified TCB 130, which serves as the fundamental component of CDS 100 by allowing CDS 100 to be easily adapted to different implementation requirements and CDS architectures. TCB 130 ensures integrity and confidentiality through a trustworthy codebase and access controls providing isolation and staticity.

All communication channels between the security boundaries pass through TCB 130 for assured security and proven functional correctness. For example, FIG. 1 denotes channels 142 and 162, of which include unidirectional mechanisms: data diodes 132 and 126, respectively. Said channels originate from a component of software component layer 103, pass through TCB 130, and end at another component of layer 103. Additionally, the data flow and TCB design ensures the staticity of channels such that all communication channels are immutable, and no additional channels may be created after compile time.

In embodiments, hardware 110 includes a memory that stores lower-security domain 140 as machine-readable instructions. CPU 180 executes these instructions, which causes CPU 180 to implement the functionality of lower-security domain 140. Similarly, TEE 120 includes a memory that stores higher-security domain 150 as machine-readable instructions, such as cypher-text instructions. CPU 180 executes these instructions, which causes CPU 180 to implement the functionality of higher-security domain 150.

In software component layer 103, there are two separate processes running on top of TCB 130: one that represents higher-security domain 150, and one that represents lower-security domain 140. Lower-security domain 140 manages the low classified data. Higher-security domain 150 manages higher-classified data.

High-side management network 170 allows for trusted remote computation and communication with higher-security domain 150 and guard 160. Higher-security domain 150 leverages NIC 112 to communicate with a high-side management network 170. Higher-security domain 150 may employ a tunneling strategy that allows the isolated high enclave to communicate with software components of the same classification which, in this embodiment, is guard 160 and high-side management network 170. Functions of the latter are relative to the system, for example, high-side management network 170 in a CDS with the primary purpose of analyzing and filtering network traffic would need to regularly push signature updates and blocking actions to sensitive intelligence sensors and traffic analyzers as well as receive alerts should a malicious packet be discovered. In a distributed computing CDS system, high-side management network 170 would regularly push code to each computing node, which would then run an operation defined by the code and send the results back to high-side management network 170.

Before data passes from higher-security domain 150 to lower-security domain 140, guard 160 may function as a filter to ensure that no high sensitive data are passed to lower-security domain 140. Guard 160 is not required in embodiments where higher-security domain 150 does not pass data back to lower-security domain 140. Guard 160 may have additional functions such as sending alerts back to higher-security domain 150.

CDS 100 includes a bidirectional data flow channel 124 between higher-security domain 150 and guard 160, as these software components reside at the same classification level. This is an important distinction from the rest of the data flow model because the direction of data flow is restricted with a data diode as depicted with a diode symbol in FIG. 1. We further discuss the data diode in Security Analysis.

G. Security Analysis

1) Hardware Protections and Memory Encryption

Relative to higher-security domain 150, TEE 120 is used to mitigate attacks from more privileged software and physical attacks with transparent memory encryption as well as protection of memory at rest, memory in transit, and memory in use, which helps mitigate the threat model. Additionally, embodiments may include padding mechanisms to increase execution time of data processing to mitigate data leakage through timing analysis. It is important to note here that in embodiments of CDS 100 that do not include TEE 120, CDS 100 provides complete formal verification but lacks the security measures required for a secure, remotely deployable system. With TEE 120, CDS 100 achieves secure remote deployability.

2) Trustworthy Components

The formally verified code base assures that no software vulnerabilities exist in its operation and that the system is proven trustworthy.

3) Decidable Object Security and Staticity

A capability-based access control model governs all kernel services so that any applications wanting to perform an operation must invoke a capability that has sufficient access rights for the service making object security decidable [2, 6, 8, 20]. There is no implicit memory allocation within the kernel, only explicit request via capability invocation [8]. Furthermore, all hardware resource partitioning is governed by capability distribution, that is, authority distribution. The component architecture model combines with the capability model to enforce staticity. Staticity a property which ensures that configurations occur before compile time so that all channels and privileges are pre-allocated and that no channels or added privileges can exist outside of what is predefined [1]. Therefore, the threat vectors involving attacks stemming from dynamic creation of channels and propagation of privileges are mitigated. The access control model also allows the system to grant specific communication capabilities which enable authorized and controlled communication between components, thus enabling, with a high degree of assurance, component isolation [20]. Component isolation and communication authenticity further mitigate threat vectors outlined in the threat model by ensuring that no user or process can access resources without authorization.

4) Computation Isolation

In addition to kernel and kernel-enforced component isolation, CDS 100 benefits from component and computation isolation within lower-security domain 140 and higher-security domain 150. In lower-security domain 140, the necessary drivers and data management services and computation are isolated from higher-security domain 150. In contrast, higher-security domain 150 hides all sensitive intelligence used to analyze the low data from lower-security domain 140.

5) Data Flow Restriction

Data diode 132 ensures that data can only travel from lower-security domain 140 to higher-security domain 150 and never back to lower-security domain 140, thus mitigating the confidentiality threat model. If the data must travel from higher-security domain 150 to lower-security domain 140 though a corresponding data diode (e.g., diode 126), the data will first pass through guard 160, which ensures that no sensitive data are passed to the lower-security domain 140, again mitigating threat vectors in the threat model.

For whichever use case vCDS is implemented, secure communication between components of the same classification level helps to mitigate the threat vectors in the threat model, while providing a secure path of remote deployability.

H. Bi-Directional Bus Architecture

Figure 2:
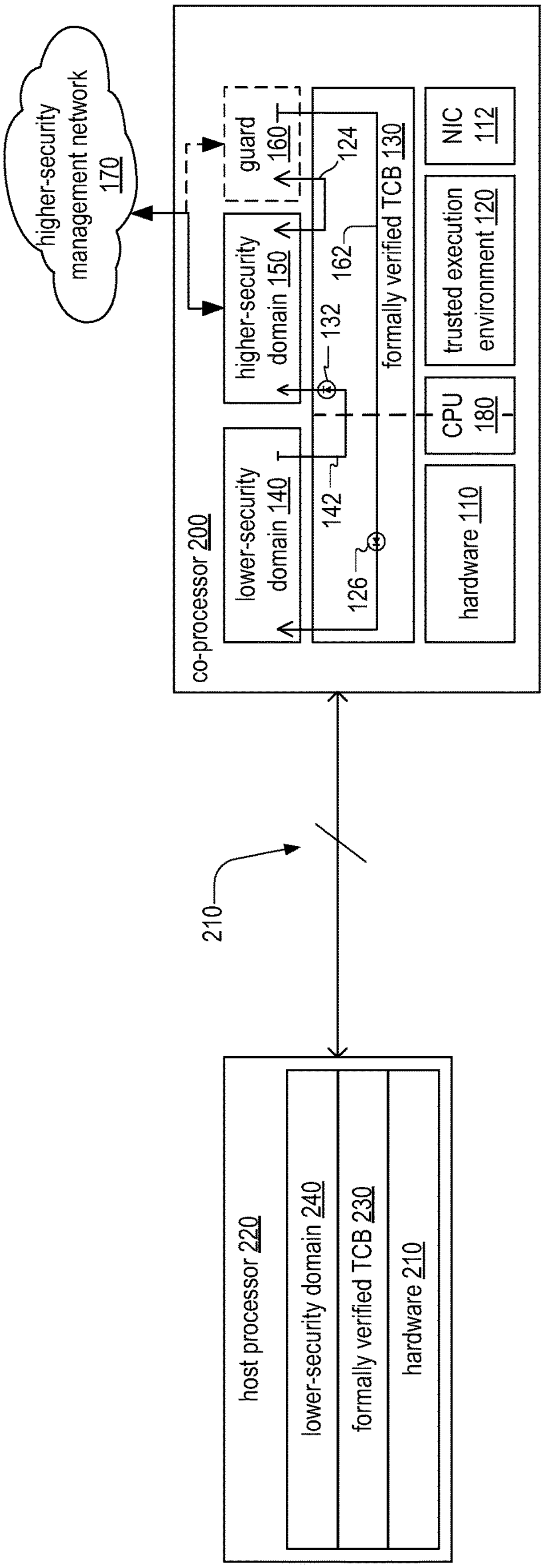
FIG. 2 shows the generic cross-domain solution of FIG. 1 further illustrating example isolation of low components with a physical, bi-directional bus architecture (e.g., PCIe) between a host processor and a co-processor, in embodiments.

FIG. 2 depicts further isolation of low components with a physical, bi-directional bus architecture (e.g., PCIe) between a host processor 220 and a co-processor 200. Co-processor 200 is an example of CDS 100. FIG. 2 illustrates the possibility of further isolation of low-security components. FIG. 2 illustrates an embodiment that provides a secure processing environment for higher-security domain 150 by isolating high computation on a co-processor board such that caches and other microarchitectural features are not shared between lower-security domain 140 and higher-security domain 150. Such shared microarchitectural features can be a vector for side-channel attacks. Host processor 220 runs a strictly low security domain, lower-security domain 240, on top of a formally verified TCB 230 and hardware 210 without any additional security mechanisms or controls.

I. Network Sensor

Figure 3:
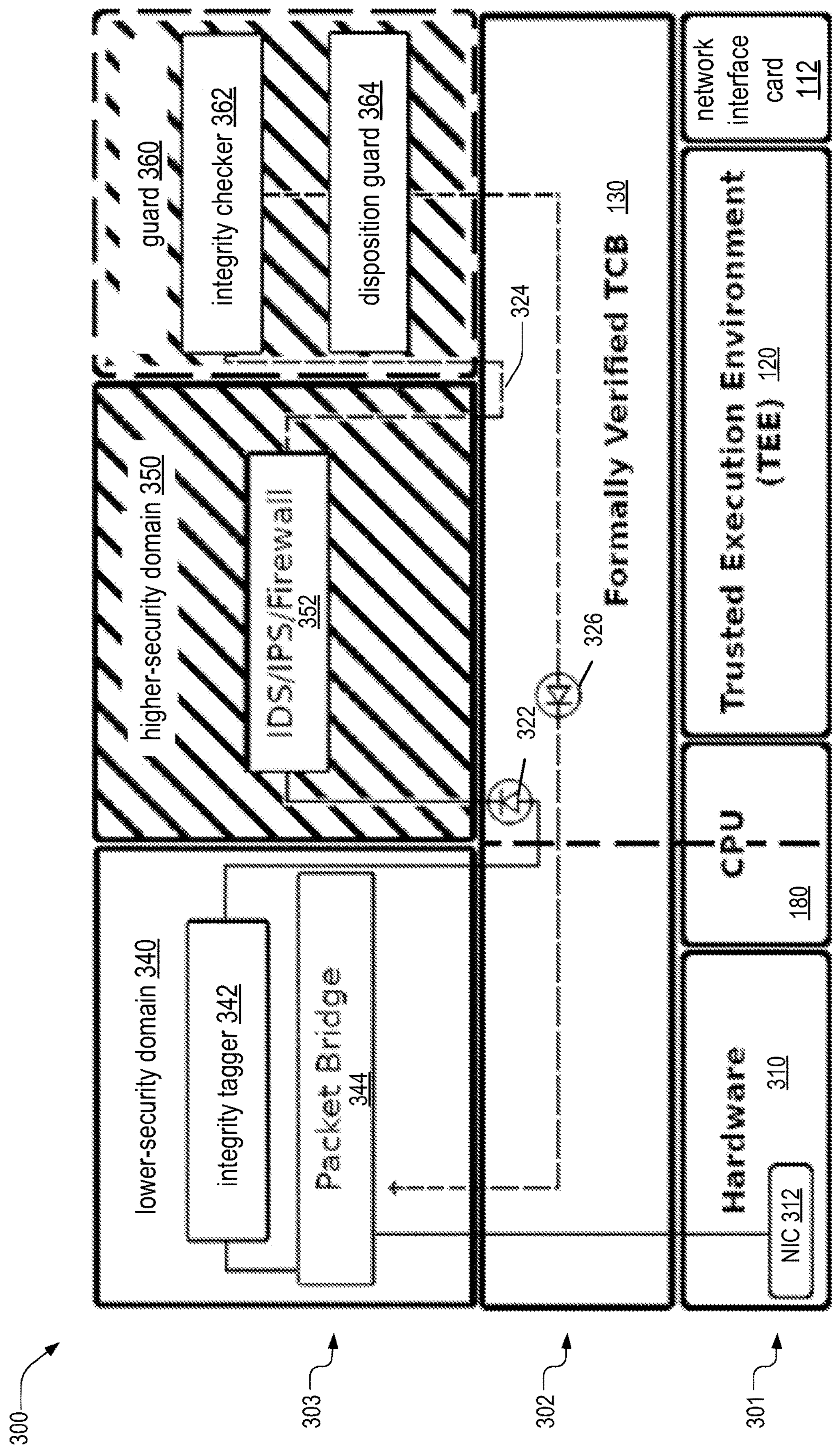
FIG. 3 is a functional block diagram one example CDS implemented as a network sensor, in embodiments.

FIG. 3 is a functional block diagram illustrating a CDS 300 implemented as a network sensor. This diagram represents an embodiment in one of several use-case specific environments. CDS 300 is an example of CDS 100, and includes a hardware layer 301, a computing base layer 302, and a software component layer 303, which are respective examples of hardware layer 101, computing base layer 102, and software component layer 103 of CDS 100. Computing base layer 302 includes formally verified TCB 130. Software component layer 303 includes a lower-security domain 340, a higher-security domain 350, and, in embodiments, a guard 360, which are respective examples of lower-security domain 140, higher-security domain 150, and guard 160.

Hardware layer 301 includes hardware 310 and CPU 180 that process the functionality of lower-security domain 340. Hardware 310 is an example of hardware 110, and includes a NIC 312. Hardware layer 301 also includes TEE 120 and NIC 112. NIC 112 connects lower-security domain 340 to the network. CPU 380 runs both domains: lower-security domain 340 and higher-security domain 350. TEE 120 enables secure memory computations for higher-security domain 350 and guard 360. Formally verified TCB 130 provides the assurance of functional correctness and security, along with the unidirectional channels which pass data from one security domain to another. A data diode 322 delineates the directional flow of the data from lower-security domain 340 and, across, into higher-security domain 350.

CDS 300 includes a bidirectional data flow channel 324 between higher-security domain 350 to guard 360. A data diode 326 forms a unidirectional data flow channel for transferring data from the higher-security domain 350 and/or guard 360 to lower-security domain 340.

In software component layer 303, lower-security domain 340 is an untrusted domain while higher-security domain 350 and guard 360 are trusted domains. Lower-security domain 340 includes a packet bridge 344 that receives the data via NIC 312, and an integrity tagger 342 that calculates a tag to securely and accurately identify the data and to provide an assurance that the data have not been modified. Higher-security domain 350 may include a network security component 352, which may be an intrusion system or a firewall. Guard 360 includes at least one of an integrity checker 362 and a disposition guard 364. Integrity checker 362 audits tags computed by integrity tagger 342. Finally, disposition guard 364 carries out the remaining checks and duties required before, discretionarily passing the data back to lower-security domain 340.

Disposition guard 364 may implement at least one of an integrity guard and a firewall. The integrity guard ensures that, upon crossing a trust boundary, the data have not been modified. Disposition guard 364 may further mitigate threats by filtering packets in or out based on a list that in includes at least one of (a) source IP addresses, (b) ports, and (c) other properties.

In summary, the flow of the data in FIG. 3 is as follows: the data are received by packet bridge 344 via NIC 312 and are identified with integrity tagger 342. From here, the data moves in one direction, controlled by data diode 322, to high side domain 350 where it passes through network security component 352. The next step depends on the system architecture based on presence or absence of guard 360. When guard 360 is not present, the data will simply transfer from higher-security domain 350 back to lower-security domain 340, through data diode 326. When CDS 300 includes guard 360, the data will flow into guard 360, and be examined by integrity checker 362. Upon a successful integrity audit, the data are passed out through the disposition guard 364, and back to the lower-security domain 340, via data diode 326.

J. High-Performance Computing/Distributed Processing System

Figure 4:
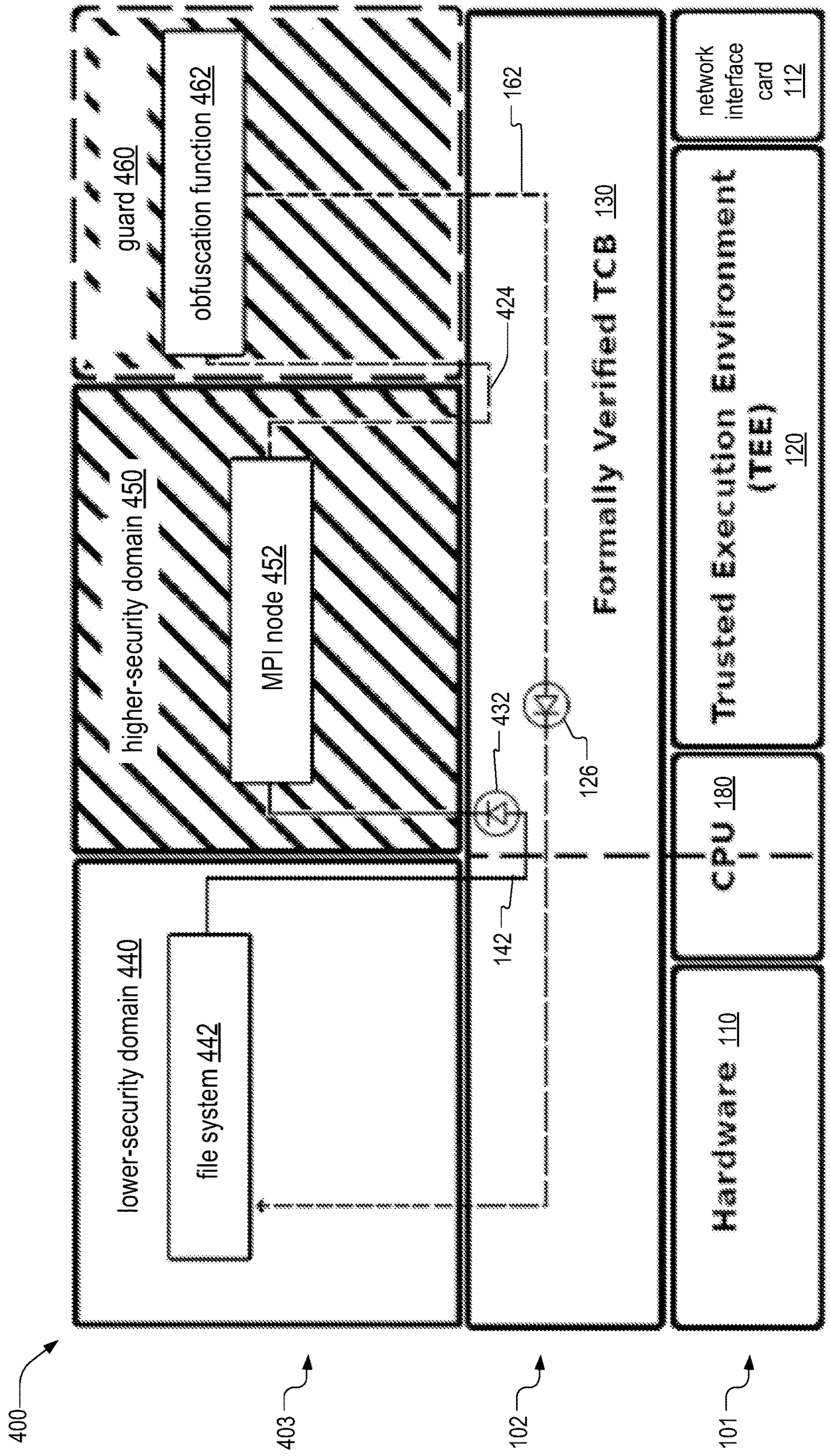
FIG. 4 is a functional block diagram illustrating further example detailed analysis of the CDS of FIG. 1, in embodiments.

FIG. 4 is a functional block diagram illustrating a CDS 400 implementing a high-performance computing/distributed processing system. FIG. 4 thus represents one of several use-case specific environments. CDS 400 is an example of CDS 100, and includes hardware layer 101, computing base layer 102, and a software component layer 403, which is an example software component layer 103 of CDS 100. Software component layer 403 includes a lower-security domain 440, a higher-security domain 450, and, in embodiments, a guard 460, which are respective examples of lower-security domain 140, higher-security domain 150, and guard 160.

Lower-security domain 440 includes a file system 442, which may be a Hadoop Distributed File System (HDFS) or Lustre file system. Higher-security domain 450 includes an MPI node 452, which may implement the MapReduce programming model.

Hardware 110 executes lower-security domain 440. CPU 480 processes data for both lower-security domain 440 and higher-security domain 450. TEE 120 enables secure memory computations for higher-security domain 450 and guard 460. Formally verified TCB 130 provides the assurance of functional correctness and security, along with unidirectional channels 142 and 162 that pass data between lower-security domain 440 and higher-security domain 450.

Data diode 432 delineates the directional flow of the data from the lower-security domain 440 and, across, into higher-security domain 450. CDS 400 may include a bidirectional data flow channel 424 from higher-security domain 450 to guard 460. Data diode 126 is another unidirectional data flow channel that serves to transfer data from higher-security domain 450 and/or guard 460 to lower-security domain 440.

At the top level of FIG. 4, lower-security domain 440 is an untrusted domain, while higher-security domain 450 and guard 460 are trusted domains. Lower-security domain 440 implements file system 442, which stores data. MapReduce 452 in the higher-security domain 450 may employ a Hadoop process. Guard 460 may implement a TCB native process and may include an obfuscation function 462. In embodiments, function 462 adds noise to channel 162 by polyinstantiating the data, In embodiments, the flow of the data in FIG. 4 is as follows: data are accessed via file system 442 and moves in one direction, controlled by data diode 432, to higher-security domain 450 where it passes through MPI node 452. The next step depends on the system architecture based on the system implementation of a guard or absence thereof. When guard 460 is not present, the data will simply transfer from higher-security domain 450, back to lower-security domain 440, through data diode 126. However, when guard 460 present, as shown in FIG. 4, the data will flow into the guard 460 and be obfuscated by obfuscation function 462. The data then travels back to lower-security domain 440 via data diode 126.

K. vCDS Implementation

Figure 5:
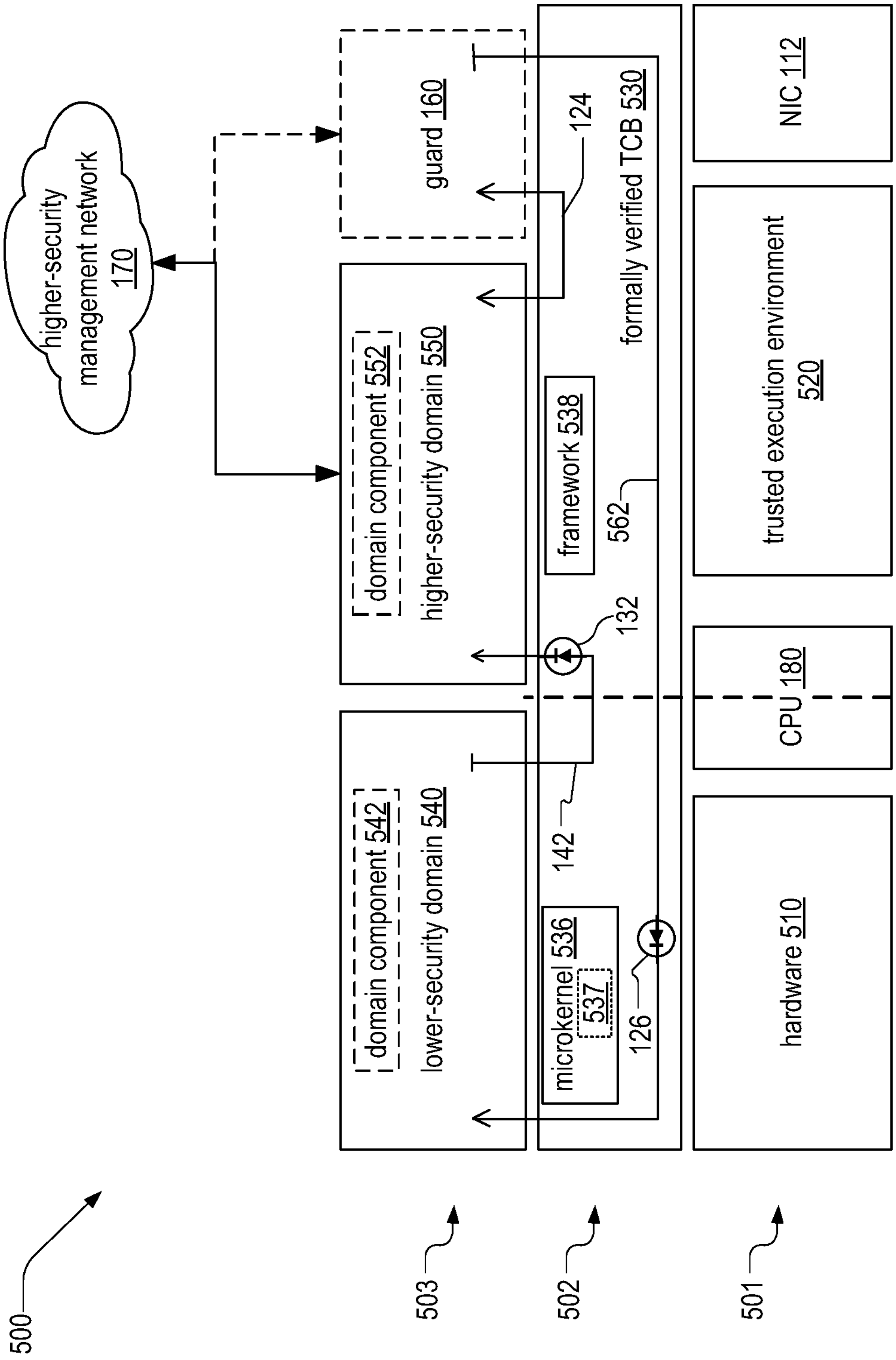
FIG. 5 is a functional block diagram illustrating a virtual cross-domain solution (vCDS), in embodiments.

This section described a resilient, cross-layer implementation of vCDS and each system component, shown in FIG. 5. That the described implementation is tailored to a stream processor application, which we call a network sensor (IPS/IDS), for the purposes of better understanding the architecture.

FIG. 5 is a functional block diagram illustrating a virtual cross-domain solution (vCDS) 500, which is an example of CDS 100. vCDS 500 includes hardware layer 501, a computing base layer 502, and a software component layer 503, which are respective examples of hardware layer 101, computing base layer 102, and software component layer 103 of CDS 100. Hardware layer 501 includes hardware 510 and a TEE 520, which are respective examples of hardware 110 and TEE 120. Hardware layer 501 also includes CPU 180 and NIC 112. Computing base layer 502 includes a formally verified TCB 530, which is an example of TCB 130. Software component layer 503 includes a lower-security domain 540, a higher-security domain 550, and, in embodiments, a guard 560, which are respective examples of lower-security domain 140, higher-security domain 150, and guard 160.

1) For Realizing Layer 1 in the Architecture

Implementation: To secure high-security components, TEE 520 includes a dedicated security processor and a hardware accelerated memory encryption mechanism. For example, TEE 520 may include a processor that supports the protection against the threat vectors outlined in the threat model. The processor may include an accelerated memory encryption mechanism that has two components: a dedicated security processor and a hardware encryption engine. The dedicated security processor provides cryptographic functionality for secure key generation and key management. The encryption engine may be implemented as part of the processor's instruction set, and encrypts data when the data are written to main memory and de-crypts data when the data are read from main memory when provided with the key. The hardware encryption engine employs a single session-sensitive key, generated by the dedicated security processor at boot, to encrypt all of system memory. In embodiments, the processor is an AMD EPYC processor [16].

The hardware encryption engine provides encryption capabilities for data at rest, data in transit, and data in use. Furthermore, memory encryption is transparent so it can support any operating system. The dedicated security processor leverages one cryptographic key per domain component to enforce isolation between each domain component and TCB 530.

Security Analysis: In embodiments, lower-security domain 540 includes a domain component 542, and higher-security domain 550 includes a domain component 552 that is isolated from domain component 542. Each of domain components 542 and 552 may include at least one of a virtual machine (VM), a native process, and a combination thereof. This isolation ensures that if an attacker has access to TCB 530, or has control over one of domain components 542 and 552, the attacker will not be able to read the memory of any other components (such as the other of domain components 542 and 552), as the memory will be encrypted. vCDS 500 takes advantage of the per-component encryption keys to ensure that data of higher-security domain 550 are confidentially maintained in the hardware. Additionally, when the CDS use-case calls for a high side remote management network (C2), the isolation of domain components 542 and 552 from TCB 530 supports the goal of remote deployability [15].

2) For Realizing Layer 2 in the Architecture: Microkernel

Implementation: TCB 530 includes a microkernel 536, which may be a formally verified microkernel, such as an seL4 operating system microkernel. Microkernel 536 leverages the trustworthiness provided through its formal verification and security guarantees. In embodiments, access control model components used in microkernel 536 are capabilities. Such capabilities may be "access tokens which support very fine-grained control over which entity can access a particular resource in a system" [10, 22]. A capability used by microkernel 536 may at least one of (i) be an immutable object reference, and (ii) enforce the principle of least privilege (POLP). In embodiments, the capability enforces the POLP by ensuring that the only way an operation can be performed on a component is by invoking the capability that is pointing to that object, thus restricting the granted rights to the absolute minimum required to perform the operation.

Security Analysis: Microkernel 536 may employ a take-grant protection model, which guarantees the benefit of confidentiality. In embodiments, objects must be statically defined to enforce the security proofs, such that the conventional take-grant rules of Create and Take are not used because they allow dynamic authority propagation. In such embodiments, microkernel 536 may employ a protection model 537. Protection model 537 includes: Grant and Remove rules (e.g., of the take-grant model or modified versions thereof), a modified Create rule, and also a Revoke operation. In embodiments, protection model 537 does not include the Take rule of the take-grant model. An example of such a model is the "seL4 protection model" which is inspired by the classical take-grant model [2, 8].

Implementation of a conventional Create rule, includes creation a new object and grating of full authority to the parent to operate on it. In the aforementioned modified Create rule of protection model 537, an existing "untyped" object, statically defined and created at boot time, is "retyped" and a capability is given to the parent with full authority. In protection model 537, the Grant rule may create new capability with diminished rights, i.e., granting lesser access to existing object. Protection model 537's Remove rule may remove capability to a single object. Implementation of the Revoke rule includes repeated calls of a remove rule (e.g., of the take-grant protection model) to remove capabilities from in an entire system.

3) for Abstracting Layer 2 and Linking to Layer 3 Components: Component Framework Implementation: To abstract away the low-level components of TCB 530, TCB 530 may include a component framework 538. Framework 538 allows the building and manipulation of the CDS on top of the static architecture of microkernel 536. Component framework 538 abstracts over low-level kernel mechanisms, providing communication primitives and support for decomposing a system into functional units [18]. Component framework 538 may use dataports, which are port interfaces, to enable one component to pass large amounts of data to another component. Dataports are made available to software components as shared memory regions at runtime. Examples of such software components include domains 540, 550, and domain components 542, 552. An example of component framework 538 is CAmkES (https://docs.sel4.systems/projects/camkes).

Security Analysis: Component framework 538 assures that, in vCDS 500, software components, interfaces, and connectors which have been specified in the architecture description language is an accurate representation of all possible interactions and that any interaction beyond what is specified will not materialize [22]. Additionally, the explicit data diode configuration of TCB 530 allows the passing of data structures through the protected kernel via a unidirectional inter-face without the possibility of leaking information through the component or kernel layers.

4) for Realizing Layer 3 in the Architecture: Linux and Microkernel Native Process Implementation: Lower-security domain 540 handles incoming traffic and transports the appropriate data to higher-security domain 550 for processing. Communication from higher-security domain 550 to lower-security domain 540 within the network sensor application occurs a separate channel 562, which may be protected by guard 160.

Security Analysis: In embodiments, guard 560 applies at least one of an intrusion prevention system (IPS) and a firewall on higher-security domain 550. Guard 560 may implement Snort software [23]. Guard 560 adheres to the primary objective of integrity by implementing both an integrity guard and a firewall, which may be called a disposition guard. The integrity guard ensures that upon crossing a trust boundary, the data have not been modified. In embodiments, guard 560 leverages the speed and security of a cryptographic hashing algorithm to check the integrity of the data. When the hashing algorithm is not formally verified, it may leverage n-version programming to improve its reliability. Guard 560 may implement the Blake3 cryptographic hashing algorithm. Guard 560 filters packets in or out based on a list of source IP addresses, ports, and other properties to further mitigate threats.

REFERENCES

[1] N. Daughety, M. Pendleton, S. Xu, L. Njilla and J. Franco, "vCDS: A Virtualized Cross Domain Solution Architecture," MILCOM 2021-2021 IEEE Military Communications Conference (MILCOM), San Diego, CA, USA, 2021, pp. 61-68, doi: 10.1109/MILCOM52596.2021.9652903.

[2] N. Daughety, M. Pendleton, R. Perez, S. Xu and J. Franco, "Auditing a Software-Defined Cross Domain Solution Architecture," 2022 IEEE International Conference on Cyber Security and Resilience (CSR), Rhodes, Greece, 2022, pp. 96-103, doi: 10.1109/CSR54599.2022.9850321.

[3] Daughety, N. (2022). Design and analysis of a trustworthy, cross domain solution architecture (Order No. 29704298). Available from ProQuest Dissertations & Theses Global. (2722317078).

[4] Department of Defense. "DoD Trusted Computer System Evaluation Criteria". In: 1985.

[5] Ryan Ausanka-Crues. "Methods for Access Control: Advances and Limitations". In: 2001.

[6] R. J. Lipton and L. Snyder. "A Linear Time Algorithm for Deciding Subject Security". In: ACM (1977).

[7] Jim Alves-foss et al. "The MILS architecture for high-assurance embedded systems". In: International Journal of Embedded Systems (2006).

[8] Dhammika Elkaduwe, Gerwin Klein, and Kevin Elphinstone. "Verified Protection Model of the seL4 Microkernel". In: Shankar, N., Woodcock, J. (eds) Verified Software: Theories, Tools, Experiments. VSTTE 2008. Lecture Notes in Computer Science, vol 5295. Springer, Berlin, Heidelberg.

[9] Bassam S. Farroha Deborah L. Farroha et al. "Challenges and Alternatives in Building a Secure Information Sharing Environment through a Community-Driven Cross Domain Infrastructure". MILCOM 2009-2009 IEEE Military Communications Conference, 2009.

[10] B. Blackham et al. "Timing Analysis of a Protected Operating System Kernel". In: IEEE 32 Real-Time Systems Symposium. 2011.

[11] Michael Hanspach and Jorg Keller. "In Guards We Trust: Security and Privacy in Operating Systems Revisited". 2013 International Conference on Social Computing.

[12] Bernard F. Koelsch and Army War College Carlisle Barracks PA. Solving the Cross-Domain Conundrum. 2013.

[13] N. Asokan et al. "Mobile Trusted Computing". In: Proceedings of the IEEE (2014).

[14] B. M. Thomas and N. L. Ziring. "Using Classified Intelligence to Defend Unclassified Networks". In: 2014.

[15] D. Kaplan, J. Powell, and T. Wolter. "AMD Memory Encryption". In: AMD Developer Central (2016).

[16] AMD. Enhance your Cloud Security with AMD EPYC Hardware Memory Encryption. Tech. rep. 2018.

[17] CloudShield. "CloudShield CS-4000: Trusted Network Security Platform (TNSP)". In: (2018).

[18] Gerwin Klein et al. "Formally Verified Software in the Real World". In: ACM (2018).

[19] Looking Glass. "LookingGlass IRD-100 Data Sheet: Stealth Threat Response at the Network Edge". In: (2019).

[20] seL4 Reference Manual Version 11.0.0. "Data61 Trustworthy Systems https://ts.data61.csiro.au/projects/TS". In: 2019.

[21] Australian Cyber Security Center. "Fundamentals of Cross Domain Solutions". In: MENA Report (2020).

[22] Gernot Heiser. "The seL4 Microkernel An Introduction"

[23] Snort. Snort: Open Source Intrusion Prevention System. https://www.snort.org/. 2021.

[24] L. Burdusel, "A Secure Communication System for classified documents over public network," 2010, pp. 485-488.

[25] Looking Glass, "Tech Specs: Threat Mitigation Platforms," 2018.

[26] P. Neumann et al. "A Provably Secure Operating System." Stanford Research Institute Final Report, Menlo Park, CA, (June 1975)

[27] G. H. Nibaldi. "Specification of a Trusted Computing Base (TCB)". In: The Mitre Corporation. 1979.

[28] Tal Garfinkel et al. "Terra: A Virtual Machine-Based Platform for Trusted Computing". In: ACM, 2003.

[29] D. E. Bell. "Looking back at the Bell-La Padula model". In: 21st Annual Computer Security Applications Conference. 2005.

[30] Ed Colbert and Barry Boehm. "Cost Estimation for Secure Software and Systems". In: Center for Systems & Software Engineering, University of Southern California. 2006.

[31] Ross J. Anderson. Security Engineering: A Guide to Building Dependable Distributed Systems. 2nd ed. Wiley Publishing, 2008.

[32] Common Criteria. "Common Criteria for Information Technology Security Evaluation". In: 2009.

[33] Farroha, B., M. Whitfield, and D. Farroha. "Enabling net-centricity through cross domain information sharing." In 2009 3rd Annual IEEE Systems Conference. IEEE, 2009. http://dx.doi.org/10.1109/systems.2009.4815782.

[34] K. Scarfone and P. Mell. "Guide to Intrusion Detection and Prevention Systems (IDPS)". In: NIST, 2009.

[35] Gerwin Klein et al. "Comprehensive Formal Verification of an OS Microkernel". In: ACM (2014).

[36] Feng Li et al. "Distributed Data Management Using MapReduce". In: ACM (2014).

[37] Brian McGillion et al. "Open-TEE—An Open Virtual Trusted Execution Environment". In: IEEE, 2015.

[38] Mohamed Sabt, Mohammed Achemlal, and Abdelmadjid Bouabdallah. "Trusted Execution Environment: What It is, and What It is Not". In: IEEE, 2015.

[39] Scott Smith. "Shedding Light on Cross Domain Solutions". In: SANS Institute Information Security Reading Room (2015).

[40] Gernot Heiser and Kevin Elphinstone. "L4 Microkernels: The Lessons from 20 Years of Research and Deployment". In: ACM (2016).

[41] Zhao-Hui Du et al. "Secure Encrypted Virtualization is Unsecure". In: (2017).

[42] Secure Technology Alliance. "Trusted Execution Environment (TEE) 101: A Primer". In: Secure Technology Alliance, 2018.

[43] United States Government US Army. JP 3-12 Cyberspace Operations. CreateSpace Independent Publishing Platform, 2018.

[44] Anna Lyons et al. "Scheduling-context capabilities: a principled, light-weight operating-system mechanism for managing time". In: 2018.

[45] Robert Buhren, Christian Werling, and Jean-Pierre Seifert. "Insecure Until Proven Updated: Analyzing AMD SEV's Remote Attestation". In: 2019.

[46] Qian Ge et al. Time Protection: The Missing OS Abstraction. 2019.

[47] Gernot Heiser, Gerwin Klein, and Toby Murray. "Can We Prove Time Protection?" In: ACM, 2019.

[48] Mengyuan Li et al. "Exploiting Unprotected I/O Operations in AMD's Secure Encrypted Virtualization". In: 28th USENIX Security Symposium. 2019.

[49] AMD. AMD SEV-SNP: Strengthening VM Isolation with Integrity Protection and More. Tech. rep. 2020.

[50] Songlin He et al. "Blockchain-Based Automated Cyber Security Management". In: (2020).

[51] Dayeol Lee et al. "Keystone: an open framework for architecting trusted execution environments". In: 2020.

[52] Phillip Mestas. "Securing AMD SEV". In: 2020.

We claim:

1. A cross-domain solution architecture, comprising:

a software layer including a higher-security domain that processes data on a higher-security level and a lower-security domain that processes data on a lower-security level having lower security than the higher-security level; and a trusted computing base (TCB) that includes a formally verified microkernel, a first data diode, and a second data diode, wherein the TCB:

(i) enforces that all inter-domain data transfers occur exclusively through the first data diode and the second data diode;

(ii) passes data from the lower-security domain to the higher-security domain through the first data diode, and passes data from the higher-security domain to the lower-security domain through the second data diode;

wherein:

the lower-security domain includes a first computing environment defined by a lower-security classification level;

the higher-security domain includes a second computing environment defined by a higher-security classification level;

the higher-security domain and the lower-security domain are separated by a boundary defined by a system security policy that enforces isolation and controlled information flow between the lower-security domain and the higher-security domain.

2. The cross-domain solution architecture of claim 1, the higher-security domain further including a guard that analyzes content of the data and determines whether the data are in accordance with the system security policy.

3. The cross-domain solution architecture of claim 1, the lower-security domain further including a network interface card, and electrically coupled thereto, a packet bridge that receives the data via the network interface card.

4. The cross-domain solution architecture of claim 3, the lower-security domain further including an integrity tagger that (i) is electrically connected to the packet bridge and (ii) calculates a tag to securely and accurately identify the data and ensure that the data have not been modified.

5. The cross-domain solution architecture of claim 4, the higher-security domain including an intrusion detection system communicatively coupled to the integrity tagger via a unidirectional communication channel that traverses the TCB.

6. The cross-domain solution architecture of claim 5, the unidirectional communication channel including a data diode.

7. The cross-domain solution architecture of claim 5, the higher-security domain further including a guard that analyzes content of the data and determines whether the data are in accordance with the system security policy.

8. The cross-domain solution architecture of claim 7, the guard including an integrity checker that audits the tag computed by the integrity tagger.

9. The cross-domain solution architecture of claim 8, further comprising an additional unidirectional channel between the integrity checker and the lower-security domain, the guard further including, on the additional unidirectional channel, a disposition guard that filters packets received from the integrity checker.

10. A cross-domain solution architecture of claim 1, wherein the first data diode communicates with the lower-security domain through a MapReduce file system, and the higher-security domain receives data from the first data diode using a MapReduce process.

11. The cross-domain solution architecture of claim 10, wherein the higher-security domain further comprises a guard configured for a TCB process containing an obfuscation function.

12. The cross-domain solution architecture of claim 11 in which the obfuscation function polyinstantiates the data.

13. The cross-domain solution architecture of claim 1, the lower-security domain including a first domain component, the higher-security domain including a second domain component that is isolated from the first domain component.

14. The cross-domain solution architecture of claim 1, the microkernel being configured to operate with memory encryption.

15. The cross-domain solution architecture of claim 1, wherein an access control model component of the microkernel is an immutable object reference.

16. The cross-domain solution architecture of claim 1, wherein an access control model component of the microkernel enforces the principle of least privilege.

17. A coprocessor implemented as a cross-domain solution (CDS) comprising:

the cross-domain solution architecture of claim 1;

a host processor operating at the lower-security level and including an additional TCB; and a bidirectional bus architecture that communicatively couples the cross-domain solution architecture to the host processor.

18. The cross-domain solution architecture of claim 1, further comprising:

a hardware layer comprising (i) hardware that executes the lower-security domain, (ii) a CPU that processes data for both the lower-security domain and the higher-security domain, and (iii) a trusted execution environment (TEE) that enables secure memory computations for the higher-security domain.

19. The cross-domain solution architecture of claim 1, each of the first data diode and the second data diode being formally verified.

20. The cross-domain solution architecture of claim 1, wherein enforcement of inter-domain data transfers through the first data diode and the second data diode is performed at least in part by the formally verified microkernel.

* * * * *